US008688696B2

(12) United States Patent
Rault et al.

(10) Patent No.: US 8,688,696 B2
(45) Date of Patent: Apr. 1, 2014

(54) MULTI-PART SEARCH RESULT RANKING (75) Inventors: Severan Sylvain Jean-Michel Rault, Redmond, WA (US); Samir Lakhani, Seattle, WA (US); Lawrence Brian Ripsher, Seattle, WA (US); Joseph Ollis, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 136 days.

(21) Appl. No.: 13/169,117

(22) Filed: Jun. 27, 2011

(65) Prior Publication Data

US 2012/0330948 A1 Dec. 27, 2012

(51) Int. Cl.
*G06F 17/30* (2006.01)
(52) U.S. Cl.
USPC .......................................... 707/728
(58) Field of Classification Search
USPC .......................................... 707/728
See application file for complete search history.

(56) References Cited

U.S. PATENT DOCUMENTS

| | | | | |
|---|---|---|---|---|
| 6,873,982 | B1 * | 3/2005 | Bates et al. | 707/737 |
| 7,571,177 | B2 | 8/2009 | Damle | |
| 7,809,721 | B2 | 10/2010 | Putivsky et al. | |
| 2002/0073056 | A1 * | 6/2002 | Broster et al. | 707/1 |
| 2006/0271280 | A1 * | 11/2006 | O'Clair | 701/208 |
| 2006/0271531 | A1 * | 11/2006 | O'Clair et al. | 707/5 |
| 2007/0156622 | A1 | 7/2007 | Akkiraju et al. | |
| 2007/0260598 | A1 | 11/2007 | Odom | |
| 2008/0016101 | A1 * | 1/2008 | Ginsburg et al. | 707/102 |
| 2008/0172374 | A1 * | 7/2008 | Wolosin et al. | 707/5 |
| 2008/0189269 | A1 | 8/2008 | Olsen | |
| 2008/0222119 | A1 * | 9/2008 | Dai et al. | 707/4 |
| 2008/0243783 | A1 * | 10/2008 | Santi et al. | 707/3 |
| 2008/0243821 | A1 * | 10/2008 | Delli Santi et al. | 707/5 |
| 2009/0132468 | A1 * | 5/2009 | Putivsky et al. | 707/2 |
| 2010/0042576 | A1 | 2/2010 | Roettger et al. | |
| 2010/0057713 | A1 | 3/2010 | Gillam et al. | |

OTHER PUBLICATIONS

Theobald, et al., "The Index based XXL Search Engine for Querying XML Data with Relevance Ranking", Retrieved at <<https://www.mpi-sb.mpg.de/departments/d5/publications/sources/2002/tw02.pdf>>, Proceedings of 8th International Conference on Extending Database Technology, Mar. 25-27, 2002, pp. 477-495.

* cited by examiner

*Primary Examiner* — Joshua Bullock
(74) *Attorney, Agent, or Firm* — Steven Spellman; Jim Ross; Micky Minhas (57) ABSTRACT

Search results responsive to a query are generated by a search engine. If the query is "location relevant", the results are provided to a ranker component. If the query is an entity search, then entities matching the query are ranked by distance from the user. If the query is not, and if it is not semantically charged, the entities are ranked either according to distance from the user or by search relevance. If the query is semantically charged, a semantic score is calculated for each entity. One or more threshold semantic scores are determined that divide the search results into multiple parts. The results within each part can then be ranked independently. The results within a first part are ranked according to their distance from the user, while the results in a subsequent part are ranked according to their semantical relationship to the query. The re-ranked parts are concatenated together.

20 Claims, 6 Drawing Sheets

MULTI-PART SEARCH RESULT RANKING

BACKGROUND

The ubiquity of the Internet and the World Wide Web (WWW) has conditioned many computer users to utilize search engines whenever they seek any type of information. Such searches are performed, by a user, through a computing device that is communicationally coupled to the Internet and the WWW. Increasingly, however, computing devices can remain communicationally coupled to the Internet and the WWW while being physically mobile, such as through wireless or cellular communication networks. While such mobile computing devices can comprise laptop computing devices, or other computing devices that provide a sufficiently sized display, or other user feedback mechanism, they increasingly comprise computing devices having substantially smaller displays, or other like user feedback mechanisms, including, for example smartphone computing devices and tablet computing devices.

While users utilizing traditional computing devices in a traditional setting may have the time and inclination to review more comprehensive listings of search results in order to find the specific information for which the user was searching, users utilizing mobile computing devices while performing other tasks, such as traveling from one location to another, typically utilize search engines to obtain a specific set of information that they desire to have presented to them as efficiently as possible. Thus, a user utilizing a mobile computing device while that user is performing other tasks, or is otherwise engaged in other activities, typically does not have the time nor the inclination to review comprehensive listings of search results. Instead, such a user desires that the search results presented to the user comprise, within the first few listings, the information sought by the user and for which the user had utilized the search engine.

Unfortunately, there is no one ranking strategy that can be equally applied to all types of user searches. For example, users searching for educational information, such as the date of a particular historical event, or the name of a popular artist, may desire to have the obtained search results presented to them ranked such that the most informative results are presented first. By contrast, a user searching for a specific establishment, such as a retail or commercial establishment, may desire to have only a limited subset of information presented to them, such as the address, telephone number, and website of such an establishment. As yet another example, a user searching for a category of establishments, such as steakhouses or coffee shops, may desire to have information presented to them such that the closest establishments within the search for a category are listed first.

SUMMARY

In one embodiment, to provide mobile users with search results ranked so as to enable such users to efficiently obtain the information they seek, search results can be divided into multiple parts, the search results within each part can be ranked utilizing ranking methodologies independent of the methodologies utilized to rank the search results within other parts, and then the multiple parts can be concatenated back together.

In another embodiment, search results can be divided into multiple parts based on whether the search query is "semantically charged" or has a non-zero "semantic score". A search query can be considered to be semantically charged if it has meaning, as opposed to search queries that are only identifiers and are not semantically charged. For example, the search query "coffee house" can be considered to be semantically charged, and can be determined to have a non-zero semantic score, while the search query "John Smith's Coffee Emporium" can be considered to not be semantically charged, since such a query has no meaning and is merely an identifier of a specific entity.

In a further embodiment, a location of the computing device through which a user performed a search can be provided and a "bounding box" can either be determined or provided together with the location of the computing device. The bounding box can define a geographic region within which entities identified by the search results can be located, such that entities outside of that region are neither ranked nor presented to the user. If an insufficient quantity of entities is found to be within the bounding box, the bounding box can be enlarged up to a maximum size to include additional entities for presentation to the user. The bounding box can be centered on the provided location of the computing device, on an area selected by the user of the computing device, such as a destination region to which the user is traveling, or it can be oriented to be along a direction of the user's travel or other like useful geographic region.

In a still further embodiment, the search results responsive to the user's search query can identify entities, such as business establishments, individuals, corporations, or other like entities. Such entities can then be ranked based on their distance from the user or a location specified by the user, their semantic relationship to the user's search query, or their search relevance, such as would have been determined by a search engine that initially generated the search results in response to the user's query.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

The following description relates to the provision of search results to a mobile user so as to enable such users to efficiently obtain the information they seek. A set of search results responsive to a user's search query are generated by a search engine. If the user's query is "location relevant", such that the user is searching for something within a defined geographic region, the search results can be provided to a ranker component that can re-rank the search results so as to enable the user to efficiently obtain the information they seek. A bounding box can be provided by the user, or can be determined by the ranker component, to identify a geographic area within which entities associated with the search results are located, such that entities outside of the bounding box are not presented to the user. If the user's query is determined to be an entity search for a specific entity, then entities matching the user's query can be ranked by their distance from the user. If the user's query is not an entity search a "semantic score" can be calculated for the user's query to determine whether the user's query is "semantically charged" or has meaning. Searches for specific entities are not considered to be "semantically charged". If a user's query is not semantically charged, the entities responsive to the user's query can be ranked either according to a distance from the user, if the user's query evidences an intent to search for entities proximate to a specified location, or, alternatively, they can be ranked by search relevance if the user's query does not evidence an intent to search for entities proximate to a specified location. Conversely, if the user's query is semantically charged, a semantic score, evidencing a semantic relationship between a particular entity and the user's query can be calculated for each entity. One or more threshold semantic scores can then be determined that can be utilized to divide the search results into two or more parts. The results within each part can then be ranked using ranking methodologies independent of the ranking methodologies utilized for other parts. For example, the results within an initial part can be ranked according to their distance from the user, while the results in a subsequent part can be ranked according to their semantical relationship to the user's query. The parts, comprising the re-ranked results, can then be concatenated together for presentation to the user.

For purposes of illustration, the techniques described herein make reference to existing and known networking infrastructure, such as the ubiquitous Internet and World Wide Web (WWW). Also for purposes of illustration, the techniques described herein make reference to existing and known protocols and languages, such as the ubiquitous HyperText Transfer Protocol (HTTP) and the equally ubiquitous HyperText Markup Language (HTML). Such references, however, are strictly exemplary and are not intended to limit the mechanisms described to the specific examples provided. Indeed, the techniques described are applicable to any search results obtained through any type of search of any collection of data, whether networked or otherwise, and the delivery of such search results to a user. Additionally, for purposes of illustration, the techniques described herein make reference to mobile users. However, such references are, also, strictly exemplary, as the mechanisms described are applicable to the delivery of search results to any user, whether mobile, or otherwise engaged in other activities, or not, and utilizing any type of computing device, whether portable or not.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

Figure 1:
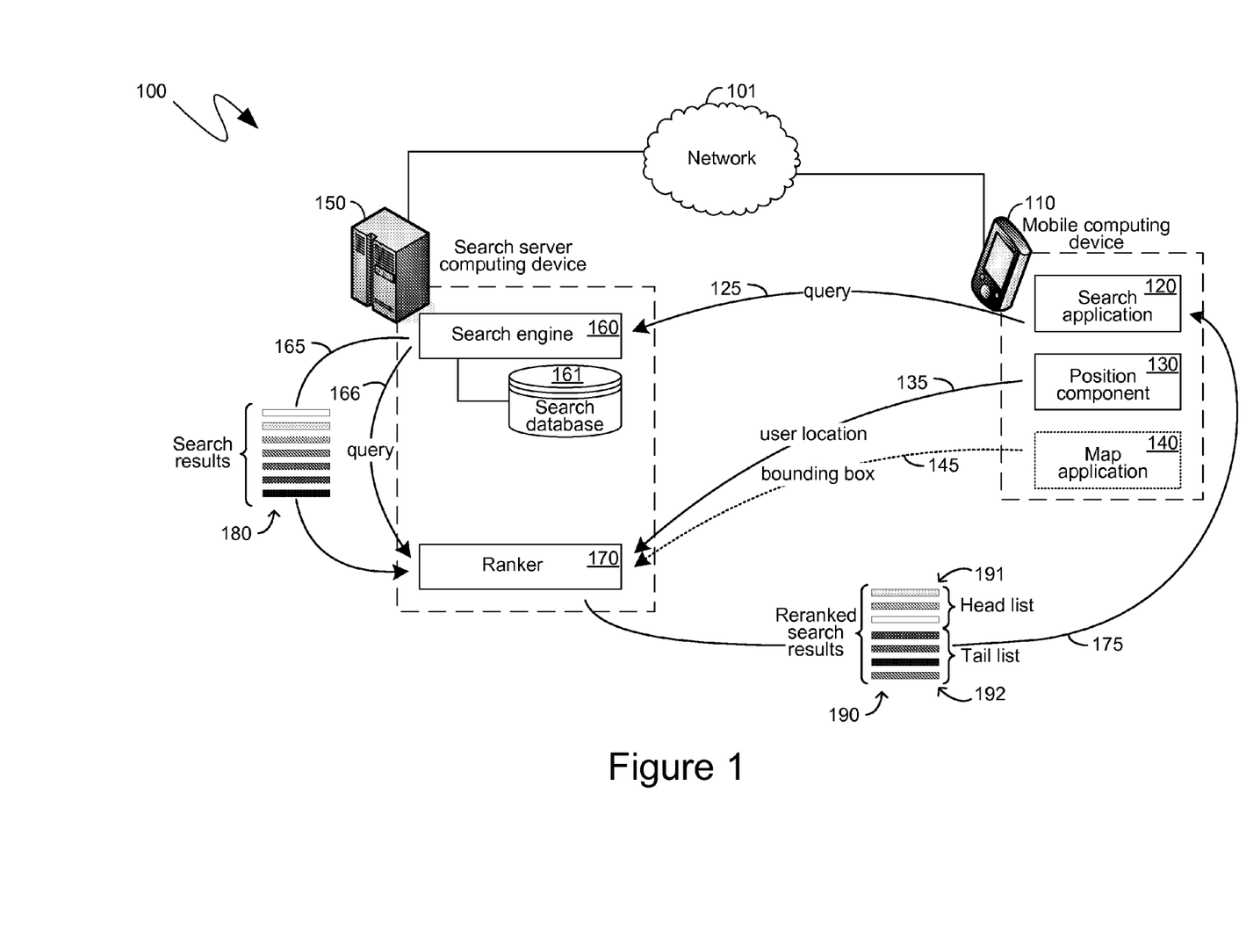
FIG. 1 is a block diagram of an exemplary operation of a multi-part search result ranking mechanism.

Turning to FIG. 1, an exemplary system 100 is shown, comprising a mobile computing device 110 and a search server computing device 150 that are communicationally coupled via a network 101, thereby enabling communications between them. For purposes of the descriptions below, the client computing device 110 will be illustrated as, and referenced as, a mobile computing device, such as, for example, a cellular telephone, a personal digital assistant, a tablet, or other like mobile computing device that is typically communicationally coupled to the network 101 via a wireless connection, including wireless cellular data connections. Although the mechanisms described in detail below are equally applicable to any type of computing device, it is likely that they will serve the greatest utility within the context of mobile computing devices, which, due to their physical capabilities often enable users to perform other tasks while simultaneously using such mobile computing devices. For example, as indicated previously, a user may be traveling to a destination, or performing some other like action, while simultaneously using the mobile computing device 110. Consequently, the user of the mobile computing device 110 may not have the capability, nor the inclination, to invest the time to peruse search results presented via the mobile computing device 110. Instead, a user of the mobile computing device 110, when searching for some information, typically desires that such information be presented to the user so as to require a minimum amount of effort on the part of the user to retrieve and understand the information. For example, a user utilizing the mobile computing device 110 to search for a coffee shop does not desire detailed information about coffee shops in general, but rather is typically searching for a specific set of information about a specific coffee shop, such as the address or telephone number of a coffee shop closest to the user. Consequently, mechanisms, such as those described in detail below, that provide a user with search results arranged in such a manner that the most relevant results, for that particular user, are presented foremost, can be especially beneficial within the context of mobile computing devices.

The mobile computing device 110, of the system 100 shown in FIG. 1, is illustrated as comprising a search application 120, a position component 130, and an optional map application 140. In one embodiment, the search application 120 can be a dedicated application that executes natively on the mobile computing device 110, and that provides a user of the mobile computing device 110 the ability to search the network 101, or otherwise provides a mechanism through which a user of the mobile computing device 110 can access one or more services being offered via the network 101. In an alternative embodiment, however, the search application 120 can be a general-purpose network browser that can simply be directed to, or otherwise utilize, a search service, such as that which could be provided by the search server computing device 150, which will be described in further detail below. Irrespective of whether the search application 120 is a native application or a general-purpose browser, the search application 120 can communicate with a search engine 160 that can be hosted by one or more server computing devices, such as the search server computing device 150.

The position component 130 of the mobile computing device 110 can comprise software, such as in the form of computer-executable instructions, hardware, or combinations thereof, that can determine and provide the geographic position of the mobile computing device 110. Typically, as will be recognized by those skilled in the art, the position component 130 can comprise a Global Positioning System (GPS) receiver that can receive signals from the Global Positioning System and, thereby, determine the geographic location of the mobile computing device 110. The position component 130, however, need not be limited to GPS hardware, and can include either the dedicated, or generalized, wireless communication hardware through which the location of the mobile computing device 110 can be determined by triangulating, or otherwise comparing, the wireless signal strengths of two or more wireless transmitters, such as wireless base stations or cellular communication towers. The position component 130 can also comprise the computer-executable instructions that can interface with such hardware and obtain therefrom the geographic location of the mobile computing device 110.

In one embodiment, the mobile computing device 110 can comprise a map application 140 that can present the user with a map interface that can be utilized by the user, in conjunction with the search application 120, to specify a geographic region within which the user wishes to search. For example, if the user is traveling to a particular destination, such as a city center, the user can utilize the map application 140 to display a geographic region surrounding, or otherwise proximate to, the city center to which the user is traveling. Then, in conjunction with the search application 120, the user can enter a search query that the user wishes to focus on the displayed geographic region. For example, a user traveling to a city center, that has utilized the map application 140 to display a geographic region surrounding the city center, can then enter the search query "coffee shop" to search for coffee shops within the displayed geographic region. As will be described in further detail below, the map application 140 can be optional and, consequently, is illustrated via a dashed line in the system 100 of FIG. 1.

As indicated, a user of the mobile computing device 110 can utilize the search application 120 to search for information and services offered via the network 101 or to otherwise transmit a query to which the user seeks a response. The information entered into the search application 120, by the user of the mobile computing device 110, such as, for example, search terms, can be transmitted to the search engine 160 that is being executed by one or more server computing devices, such as the exemplary search server computing device 150 shown in the system 100 of FIG. 1. The transmission, to the search server computing device 150, of the search terms entered by the user into the search application 120, hereinafter referred to as the user's "search query" or "query", is illustrated by the communication 125, shown in the system 100 of FIG. 1. Upon receiving the query transmitted by the communication 125, the search engine 160 can reference a search database 161, such as in a manner well known to those skilled in the art, to identify one or more responsive collections of information, that are accessible via the network 101. Typically, such responsive collections of information, hereinafter referred to as "search results" are identified by links, or other identifiers, through which the mobile computing device 110 could communicate with them via the network 101.

The search results responsive to the user query, which was transmitted by the communication 125, are illustrated in the system 100 of FIG. 1 as the search results 180. To visually represent the operation of the ranker 170, at least in a generalized manner, the search results 180 are represented by the rectangles shown in FIG. 1, with each individual search result, from among the search results 180, being shown as a differently shaded rectangle. Additionally, the search results 180, as initially compiled by the search engine 160, can be oriented in a particular manner. More specifically, search engines, such as the search engine 160, traditionally comprise mechanisms, and utilize methodologies, for ranking search results, such as the search results 180, so that the result that a typical user is most likely to find most useful is the first result that is presented to the user. As will be recognized by those skilled in the art, such ranking mechanisms and methodologies are based, at least in part, on the connectivity between a collection of data, such as a document, that is identified by the search result and other documents, sites or other like collections of data that are part of, or communicationally coupled to, the network 101. Such ranking mechanisms and methodologies are also based, at least in part, on the utilization of key terms, or other like data expressions, within the document identified by the search result.

However, the ranking mechanisms and methodologies utilized by the search engine 160 are, as indicated previously, not tailored to users of mobile computing devices, such as the mobile computing device 110, where such users are often engaged in other activities and are often looking for a well defined and specific set of information, such as an address, a telephone number, a web page, or other like collection of data of a specific entity, such as a specific business establishment. As a result, if the search results 180 were presented to the user of the mobile computing device 110 in the order generated by the search engine 160, the user would, likely, not find the specific, defined set of information for which they were searching quickly and, as a result, the ranking of the search results 180, by the search engine 160, would be sub-optimal for the user of the mobile computing device 110. To graphically illustrate the operation of the ranker 170, the search results 180, ranked in the manner in which they would be ranked by the search engine 160, are illustrated in FIG. 1 with shaded rectangles, where the shading of the rectangles proceeds from light shading to dark shading. Thus, the ordering of the rectangles representing the search results 180 in order from lightest to darkest is meant to visually represent the ranking of the search results as they would have been provided by the search engine 160. Conversely, an ordering of the rectangles representing the search results 180 in another order, such as where darker shaded rectangles are ordered ahead of lighter shaded rectangles, is meant to visually represent a re-ranking of the search results in a different order.

In one embodiment, a ranker component 170 can receive the search results 180, such as by the communication 165 from the search engine 160. While the ranker 170 is illustrated as a component, or collection of computer-executable instructions, that executes on the same search server computing device 150 as the search engine 160, the location of the ranker 170 is not so limited. More specifically, the ranker 170 can be comprised of computer-executable instructions that execute on the search server computing device 150, on other server computing devices, on the mobile computing device 110, or combinations thereof in distributed embodiments.

In addition to receiving the search results 180, such as via the communication 165, the ranker 170 can also receive the user's query. In the embodiment illustrated by the exemplary system 100 shown in FIG. 1, the user's query can be provided to the ranker 170 by the search engine 160 via the communication 166. In another embodiment, however, the ranker 170 can receive the user's query directly from the mobile computing device 110, such as via a communication analogous to the communication 125 shown in FIG. 1.

To enable the ranker 170 to re-rank the search results 180 in an order more suited to the user of the mobile computing device 110, the ranker 170 can also receive the location of the user. In one embodiment, the user's location can be provided to the ranker 170 by the mobile computing device 110, such as by reference to the position component 130, described in detail above, as illustrated by the communication 135. The ranker 170 can also, optionally, receive geographic information from the mobile computing device 110. Such geographic information can indicate a geographic area within which the user wishes to focus the search for results responsive to the user's query. For example, as described above, a user of the mobile computing device 110 can, such as via an optional map application 140, select a geographic area within which the user wishes to focus the search. Such a selection can define a "bounding box" within which the search is to be focused, such that results identifying entities that are geographically located beyond such a bounding box will be excluded and not presented to the user. The provision of a bounding box from the mobile computing device 110 can be optional and, as such, the communication 145 providing such bounding box information to the ranker 170 is illustrated via a dashed line.

With the search results 180, such as those provided by the communication 165, the user's query, such as that provided by the communication 166, and the user's location, such as that provided by the communication 135, the ranker 170 can, in one embodiment, rank the search results 180 so as to be more beneficial to the user of the mobile computing device 110. As an initial step, mechanisms associated with the search engine 160, such as a search classifier that can attempt to classify, or categorize, different types of user queries, can determine whether the user's query was a "location relevant" query in which the user was searching for information that has meaning and context within a specific location. If such a search classifier determines that the query, such as the query transmitted by the communication 125, is a location relevant query, then the search results 180 can be communicated to the ranker 170, such as via the communication 165. Conversely, if the search classifier determines that the query is not a location relevant query, then the search results 180 need not be provided to the ranker 170, such as via the communication 165, and can, instead, simply be returned to the mobile computing device 110 directly. Thus, in such an embodiment, the ranker 170 can receive those search results, such as the search results 180, that are only responsive to the location relevant queries.

In one embodiment, the ranker 170 can compile an entity list from the search results 180. As will be recognized by those skilled in the art, a location relevant query is typically a search for one or more entities, such as businesses, individuals, locations, or other like entities, within a particular geographic area. Additionally, as will also be recognized by those skilled in the art, and as indicated previously, the users of mobile computing devices, such as the mobile computing device 110, when making such a location relevant query, are typically searching for a defined and specific set of information about an entity, such as that entity's name, address, telephone number, website, or other like information. By contrast, users of mobile computing devices, when making location relevant queries, are typically not searching for detailed information about an entity, such as that entity's history, a listing of corporate executives, or other like information often found in data collections that are part of the network 101. Consequently, in one embodiment, the ranker 170 can compile an entity list from the search results 180 where such an entity list comprises, for each entry in the entity list, a defined set of information that is likely to be useful to a user of the mobile computing device 110. For example, the ranker 170 can compile, for each entry in the entity list, that entity's name, geographic address, telephone number, website information, and other like information. The ranker 170 can obtain such information from the search results 180. For purposes of illustrating the operation of the ranker 170, each of the search results 180 will be assumed to correspond to a single entity, such that, when compiling the entity list, the ranker 170 can generate an entity list that has a one-to-one correspondence with the search results 180. However, to be clear, no such one-to-one correspondence is required, and the ranker 170 can generate an entity list from any type of search results 180.

Once the ranker 170 has generated an entity list from the search results 180, the ranker can determine the physical location of each of those entities and further determine, based on their physical locations, which of those entities are within a bounding box defining a geographic region within which the user of the mobile computing device 110 meant to conduct their search. In one embodiment, as illustrated by the exemplary system 100 of FIG. 1, and as indicated previously, a bounding box can be provided to the ranker 170 from the mobile computing device 110, such as from the map application 140, via the communication 145. In another embodiment, however, the ranker 170 can determine the bounding box on its own based on other information provided to it, such as the user's query, provided by the communication 166, and the user's location, provided by the communication 135. For example, in one embodiment, the ranker 170 can establish a bounding box around the user's location, such as would have been provided to it by the communication 135. In another embodiment, the ranker 170 can establish a bounding box around a geographic region referenced, either directly or indirectly, by the user's query, such as could have been provided to it by the communication 166. For example, if the user's query evidenced an intent to search for an entity in a specific geographic region, such as by specifying that geographic region as part of the query, the ranker 170 can establish a bounding box around that geographic region even though the user's location may not be proximate to that geographic region.

Once the ranker 170 has generated a bounding box, or has been provided one, such as by the mobile computing device 110, those entities that the ranker has determined are not geographically located within such a bounding box can be set aside and further processing can proceed only with those entities, and their associated search results, that are within the bounding box. If the user's query is not merely a location relevant query but is, in fact, an entity search, such as a query for a specific entity, typically performed by specifying that entity's proper name, then the ranker 170 can first filter out, from the entity list, all those entities that are not the entity that was specifically searched for. The remaining list of entities, and, by proxy, the search results associated with them, can then be ranked based on a distance from the user's location, such as can have been provided by the communication 135. Such a differently ranked listing of entities, and the search results associated with them, can then be provided by the ranker 170 to the user of the mobile computing device 110, such as by returning such a listing to the search application 120.

Conversely, if the user's query is not for a specific entity, the ranker 170 can proceed to determine whether the user's query is "semantically charged". As indicated previously, a query is considered to be semantically charged if it has meaning. For example, a search for a specific entity would not be semantically charged because the proper name of that entity has no meaning other than being a proper name of an entity. Conversely, a search for a category or a description would be semantically charged because such a category or description does have meaning. Thus, for example, a search for the term "coffee shop" would be considered to be semantically charged, while a search for the term "John Smith's Coffee Emporium" would not be because the term "John Smith's Coffee Emporium" does not have any meaning other than as the proper name for a business entity that sells coffee.

If the ranker 170 determines that the user's query is not semantically charged, then the user's query can, essentially, be a search for a specific entity, although it may not have been recognized as an entity search. As indicated previously, in the case of an entity search, the ranker 170 can filter out those entities from the entity list derived from the search results 180 that did not correspond to the entity being searched for. Here, however, since the search was not recognized as an entity search but rather only as a search whose query is not semantically charged, the ranker 170 can retain the entities derived from the search results and can, instead, determine whether a sufficient quantity of those entities is within the bounding box, whose determination was described in detail above. If an insufficient quantity of entities is within the bounding box, the ranker 170 can increase the geographic area enclosed by the bounding box to increase the quantity of entities that are geographically located within the bounding box. Once the bounding box is increased so as to encompass a minimum quantity of entities, or once the bounding box is increased such that it reaches a maximum size, the entities whose geographic location is within the geographic region bounded by the bounding box can be ranked by the ranker 170 and then presented to the user of the mobile computing device 110.

In one embodiment, to determine how to rank such entities, the ranker 170 can consider whether the user's query evidences an intention, by the user, to search for entities proximate to that user's location, or whether it evidences an intention to search for entities proximate to a geographic area that may not be associated with the user's location, such as, for example, a geographic area to which the user is traveling, or a geographic area that the user intends to visit at a later point in time. If the ranker 170 determines that the user's query evidences an intention, by the user, to search for entities proximate to that user's location, then the ranker 170 can rank those entities that are within the bounding box in accordance with their distance from the user and can then present the entities, and associated search results, ranked in this manner, to the user of the mobile computing device 110. Conversely, if the ranker 170 determines that the user's query evidences an intention, by the user, to search for entities in another geographic area that is not proximate to the user's location, the ranker 170 can rank those entities that are within the bounding box in accordance with the ranking they were given by the search engine 160, which will be referred to herein as "search relevance".

If, on the other hand, the ranker 170 determines that the user's query is semantically charged, then the ranker 170 can proceed to determine a semantic score for each entity in the list of entities that was derived from the search results 180 and that are within the bounding box. The semantic score for a particular entity can represent the semantic differences between the user's query and the information contained in the search result that is associated with that entity. Based on the semantic scores of the entities a threshold semantic score can be determined by the ranker 170 such that those entities having a semantic score above that determined threshold can be ranked utilizing different mechanisms and methodologies from those entities having a semantic score below that determined threshold. The entities having semantic scores above the threshold can be part of what can be referred to as a "head list", while the entities having semantic scores below the threshold can be part of what can be referred to as a "tail list". Although described within the context of a single threshold dividing the search results into two parts, namely those search results associated with entities in the head list and those search results associated with entities in the tail list, the mechanisms described are not limited to two-part division of a listing of search results and are, instead, equally applicable to any multipart division of such a listing of search results. In such multipart division embodiments, the ranker 170 can determine multiple semantic thresholds to divide the search results into multiple parts. Additionally, while described within the context of a division into parts in accordance with semantic scores, other relevance measures can be utilized so long as each result can be associated with a defined relevance score along which lines the division into parts can be performed.

Before ranking the entities, in one embodiment, the ranker 170 can first determine whether there are a sufficient quantity of entities in one or more of the parts into which the search results have been divided. For example, the ranker 170 can determine whether there are a sufficient quantity of entities in the head list. If an insufficient quantity of entities are in the head list, the ranker 170 can expand the bounding box to include additional entities, both in the head list and in the tail list. Such an expansion of the bounding box can continue until either a minimum number of entities is reached in the head list, or a maximum geographic size of the bounding box is reached.

Subsequently, in one embodiment, the ranker 170 can rank the entities in the tail list by their semantic scores, while the entities in the head list can be ranked using other methodologies. For example, if the ranker 170 determines that the user's query evidences an intention, by the user, to search for entities proximate to that user's location, then the ranker 170 can rank those entities in the head list in accordance with their distance from the user. Conversely, if the ranker 170 determines that the user's query evidences an intention, by the user, to search for entities in another geographic area that is not proximate to the user's location, the ranker 170 can rank the entities in the head list in accordance with their search relevance.

Once the entities in the head list and tail list have been ranked, using their independent, respective ranking methodologies and mechanisms, the two lists can be concatenated back together into a reranked search results 190 and can be provided to the user of the mobile computing device 110, such as is illustrated by the communication 175 shown in the system 100 of FIG. 1. As graphically illustrated in FIG. 1, the reranked search results 190 can comprise a head list 191 that comprises the top three search results from the search results 180, except now ranked in a different order, and the reranked search results 190 can also comprise a tail list 192 that comprises the bottom four search results from the search results 180, now also ranked in a different order and, ranked utilizing a different methodology than the methodology that was utilized to rank the results in the head list 191.

By dividing the search results 180 into multiple parts, different ranking methodologies and mechanisms can be applied to the parts individually, resulting in a benefit to the user to whom such reranked results are presented. For example, the tail list 192 can be ranked in accordance with the semantical relationship between the entities in the tail list and the user's query, while the head list 191 can be ranked in accordance with the distance between the entities in the head list 191 and the user's location. Were the search results 180 not divided into parts, and were, instead, all ranked in accordance with the distance between those entities and the user's location, for example, it is possible that certain entities that may not have been very relevant can have been pushed to a much higher ranking simply because they were geographically close to the user. However, by dividing out the entities that have a high semantical relationship with the user's query into the head list 191, those entities can be ranked by distance from the user without concern that irrelevant entities will be highly ranked simply due to their proximity to the user. At the same time, however, the remaining entities can still be present in the tail list 192 to ensure that the user finds the information they were searching for within the presented search results.

Figure 2:
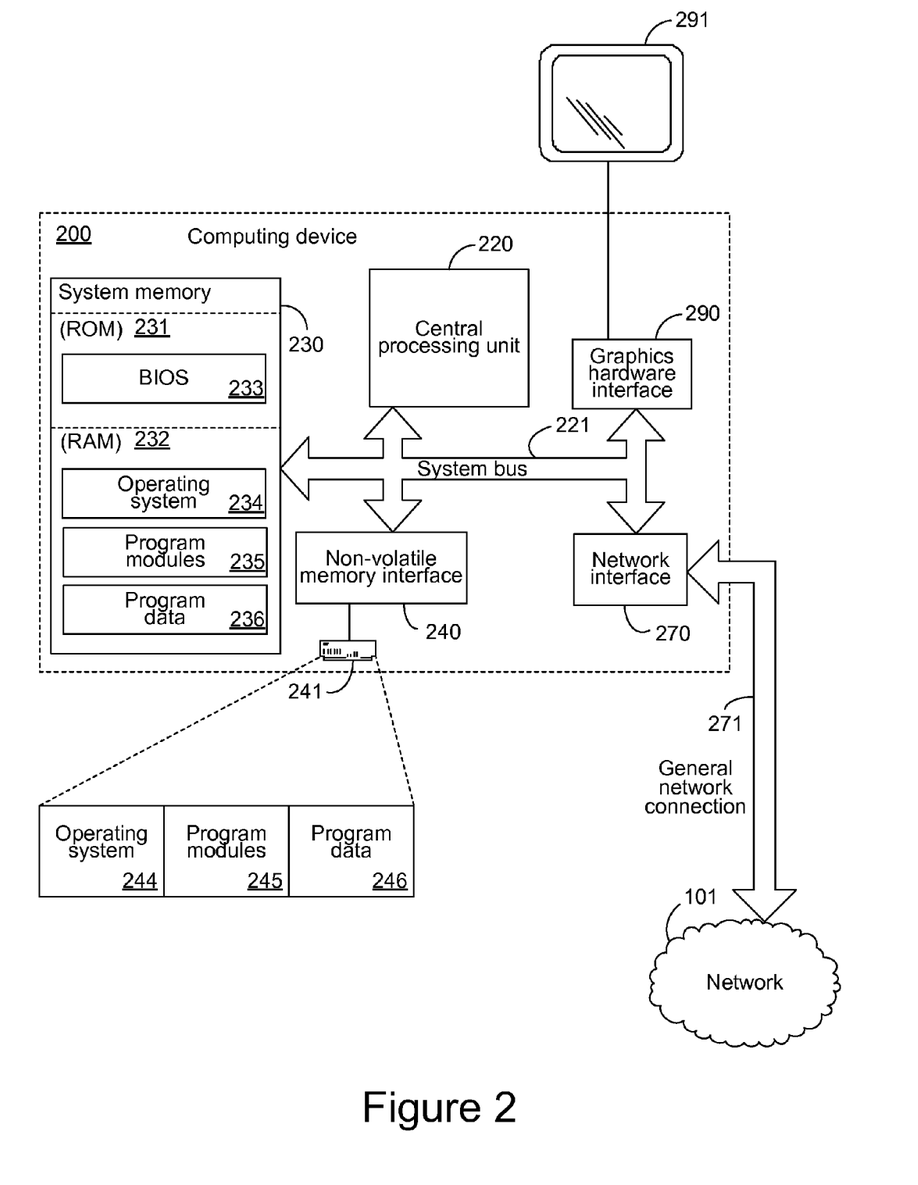
FIG. 2 is a block diagram of an exemplary computing device.

Before proceeding with a further detailed description of the operation of the ranker 170, a detailed description is provided of an exemplary computing device, such as the search server computing device 150, the mobile computing device 110, or any other computing device upon which the mechanisms described can be executed and utilized. Turning to FIG. 2, such an exemplary computing device 200 is illustrated. As indicated, the exemplary computing device 200 can be any one or more of the client computing device 110 and the server computing device 150 illustrated in FIG. 1, whose operations were described in detail above. For example, the computing device 200 can be a cellular telephone, personal digital assistant, tablet computing device or other like mobile computing device. Similarly, the exemplary computing device 200 can be a server computing device, or a computing device that can be executing one or more processes that can represent a server computing device, such as the server computing device 150 illustrated in FIG. 1, such as, for example, by executing one or more processes that create virtual computing environments that can provide for the operations detailed above. The exemplary computing device 200 of FIG. 2 can include, but is not limited to, one or more central processing units (CPUs) 220, a system memory 230, that can include RAM 232, and a system bus 221 that couples various system components including the system memory to the processing unit 220. The system bus 221 may be any of several types of bus structures including a memory bus or memory controller, a peripheral bus, and a local bus using any of a variety of bus architectures. The computing device 200 can optionally include graphics hardware, such as for the display of visual user interfaces, including, but not limited to, a graphics hardware interface 290 and a display device 291. Depending on the specific physical implementation, one or more of the CPUs 220, the system memory 230 and other components of the computing device 200 can be physically co-located, such as on a single chip. In such a case, some or all of the system bus 221 can be nothing more than silicon pathways within a single chip structure and its illustration in FIG. 2 can be nothing more than notational convenience for the purpose of illustration.

The computing device 200 also typically includes computer readable media, which can include any available media that can be accessed by computing device 200 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 200. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 230 includes computer storage media in the form of volatile and/or nonvolatile memory such as read only memory (ROM) 231 and the aforementioned RAM 232. A basic input/output system 233 (BIOS), containing the basic routines that help to transfer information between elements within computing device 200, such as during start-up, is typically stored in ROM 231. RAM 232 typically contains data and/or program modules that are immediately accessible to and/or presently being operated on by processing unit 220. By way of example, and not limitation, FIG. 2 illustrates the operating system 234 along with other program modules 235, and program data 236.

The computing device 200 may also include other removable/non-removable, volatile/nonvolatile computer storage media. By way of example only, FIG. 2 illustrates the hard disk drive 241 that reads from or writes to non-removable, nonvolatile media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 241 is typically connected to the system bus 221 through a non-removable memory interface such as interface 240.

The drives and their associated computer storage media discussed above and illustrated in FIG. 2, provide storage of computer readable instructions, data structures, program modules and other data for the computing device 200. In FIG. 2, for example, hard disk drive 241 is illustrated as storing operating system 244, other program modules 245, and program data 246. Note that these components can either be the same as or different from operating system 234, other program modules 235 and program data 236. Operating system 244, other program modules 245 and program data 246 are given different numbers hereto illustrate that, at a minimum, they are different copies.

The computing device 200 can operate in a networked environment using logical connections to one or more remote computers. The computing device 200 is illustrated as being connected to the general network connection 271 through a network interface or adapter 270, which is, in turn, connected to the system bus 221. In a networked environment, program modules depicted relative to the computing device 200, or portions or peripherals thereof, may be stored in the memory of one or more other computing devices that are communicatively coupled to the computing device 200 through the general network connection 271. It will be appreciated that the network connections shown are exemplary and other means of establishing a communications link between computing devices may be used.

Figure 3A:
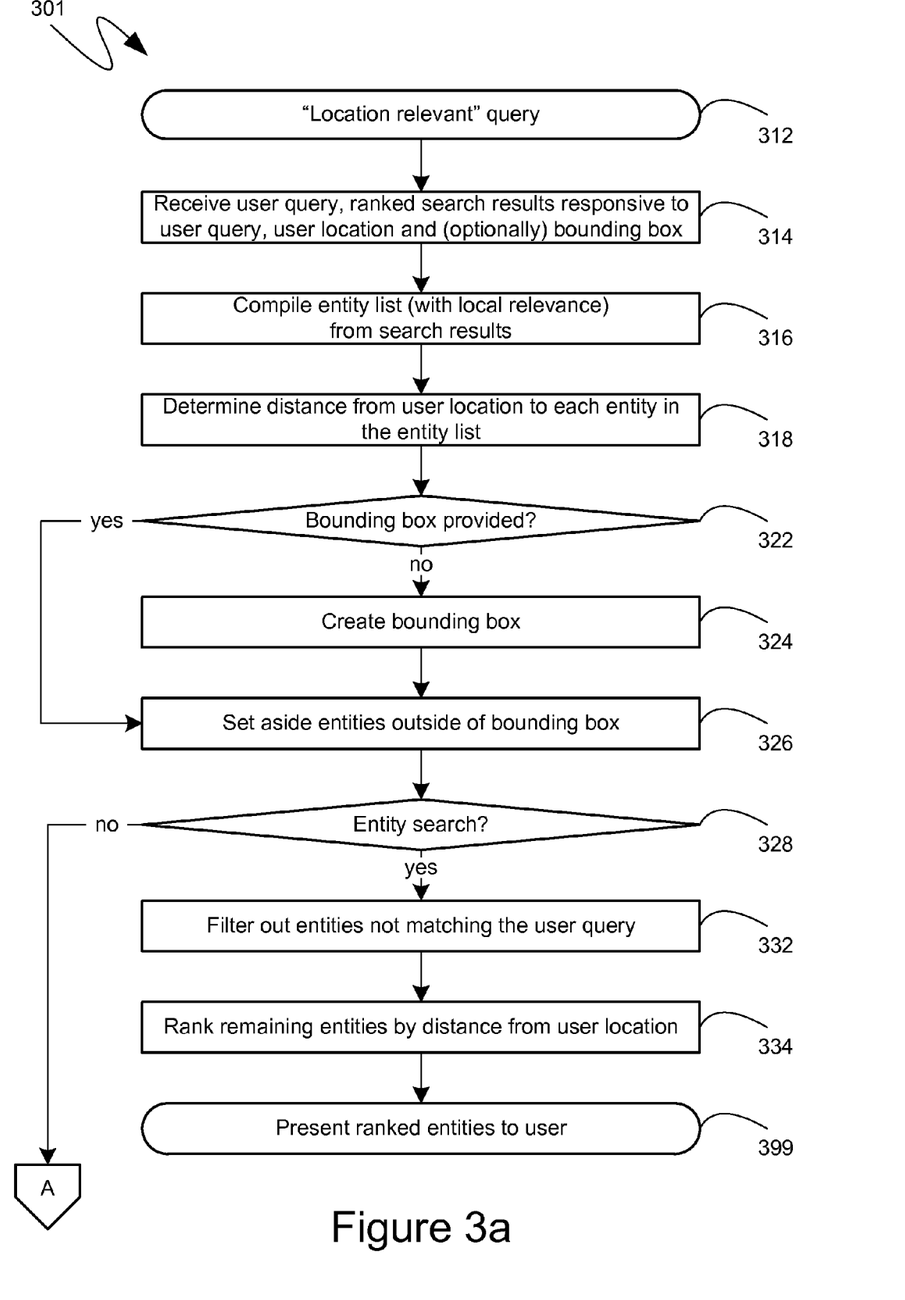
FIGS. 3a-d are a flow diagram of an exemplary operation of a multi-part search result ranking mechanism.

Turning now to FIG. 3a, the flow diagram 301 shown therein illustrates an exemplary series of steps that can be performed, such as by the ranker 170, illustrated previously in FIG. 1. Initially, at step 312, a location relevant query can be received, such as by a search engine that comprises a component, such as a classifier, that can identify the received query as a location relevant query that appears to be searching for information that has context within a particular geographic area. If such a location relevant query is received, as illustrated by step 312, processing can proceed to step 314 where that user's query can be received, as can a set of search results responsive to that query, such as can have been generated by a search engine, as well as the user's geographic location and, optionally, a bounding box or other demarcation of a geographic region within which the search is to be focused.

With the search results received at step 314, an entity list can be compiled at step 316. As indicated previously, a user performing a location relevant query is typically looking for a defined and specific set of information, such as a name of an entity, its geographic address, its telephone number, its website, and other like information. By contrast, the search results received at step 314 typically comprise pointers to collections of data, such as links to websites, where those collections of data comprise substantially more information than what the user is looking for. For example, even a simple website for a coffeehouse will likely include a substantial amount of information, such as pictures, upcoming events, details regarding coffee, and other like information that may not be immediately desirable by a user utilizing a mobile computing device to search for such a coffeehouse. Instead, as will be recognized by those skilled in the art, such a user would most likely, at least initially, be interested in the coffeehouse's name, location, telephone number, and potentially other simple information such as its hours of operation. Consequently, in one embodiment, the search results received at step 314 can be utilized to compile the entity list 316, where a specific subset of information, such as the aforementioned name, geographic location, telephone number, and website, can be parsed from the search results and brought together in a simpler presentation where each entry in the created entity list represents a single entity, such as the aforementioned coffeehouse. For purposes of the simplifying description provided herein, it was assumed that there was a one-to-one correspondence between the search results received at step 314 and the entity list created at step 316 such that each of the search results received at step 314 referenced one single entity that was different from the entities referenced by the other search results. Thus, as utilized herein, reference to entities in the entity list created at step 316 also include references to the corresponding search result from among the search results received at step 314. However, as will be recognized by those skilled in the art, no such one-to-one correspondence is required by any of the mechanisms described herein and, instead, many-to-one and one-to-many correspondences are equally applicable and could be accommodated without change to the mechanisms described.

In one embodiment, at step 316, in addition to compiling the entity list from the search results received at step 314, a local relevance value can also be associated with each of the entities in the entity list. Subsequently, at step 318, a distance from the user's location, as received at step 314, can be determined for each entity in the entity list that was compiled at step 316. At step 322 a check can be made as to whether a bounding box was already received, such as at step 314. As indicated previously, such a bounding box can have been provided by the mobile computing device, for example, by specifying a geographic area that the user selected in a mapping application as an indication of the geographic area within which the user wished to have the search performed.

If, at step 322, it is determined that the bounding box was provided, then processing can proceed with step 326. If, however, at step 322, it is determined that the bounding box was not provided, then processing can first proceed to step 324 at which point a bounding box can be created. In one embodiment, at step 324, a bounding box can be created around the users location that was received at step 314. In another embodiment, however, the bounding box that is created at step 324 can be centered on a geographic area that can have been referenced, either directly or indirectly, by the user's query that was received at step 314. For example, if the user had searched for "John Smith's Coffee Emporium Seattle, Wash.", a bounding box can be created that is centered on a geographic region associated with the town of Seattle, Wash. In yet another embodiment, the bounding box created at step 324 can be positioned such that it includes the user's location, or is otherwise proximate to it, but is instead aligned along a direction in which the user is currently traveling. Such a bounding box can enable the user to search for entities that are along the user's route. As will be recognized by those skilled in the art, the direction in which the user is traveling can be obtained from multiple user locations over a short period of time, or it can be obtained directly from the mobile computing device, since many complete mobile computing devices comprise not only location information, but also directional movement information, and even acceleration information. With the bounding box, processing can proceed to step 326 where the entities in the entity list that was compiled at step 316 that are not within the bounding box can be set aside. The remaining processing can then proceed only with those entities whose geographic locations are within the bounding box, although, as will be described in further detail below, if the geographic size of the bounding box is increased, then additional entities, from the entity list compiled at step 316, can become entities that are within the bounding box and, as such, included in subsequent processing.

At step 328, a determination can be made as to whether the user's query that was received at step 314 is an entity search. As indicated previously, an "entity search" is a search, by the user, for a specific entity, typically utilizing that entity's proper, or trade, name. If, at step 328, it is determined that the user's search is an entity search, then processing can proceed with step 332, where the entities not matching the user's query can be filtered out. The remaining entities, after step 332, are those entities, from the entity list compiled at step 316, that are inside the bounding box, since the entities outside of the bounding box were set aside at step 326, and that are relevant to the users query, since the entities not matching the user's query were filtered out at step 332. At step 334, those remaining entities can then be ranked in accordance with their distance from the user's location, such as can have been determined at step 318. Typically, such a ranking would rank those entities closest to the user's location more highly than those entities that are farther from the user's location. Once the entities have been ranked at step 334, processing can proceed to step 399 where the relevant processing can end with the presentation of the ranked entities to the user.

Figure 3B:
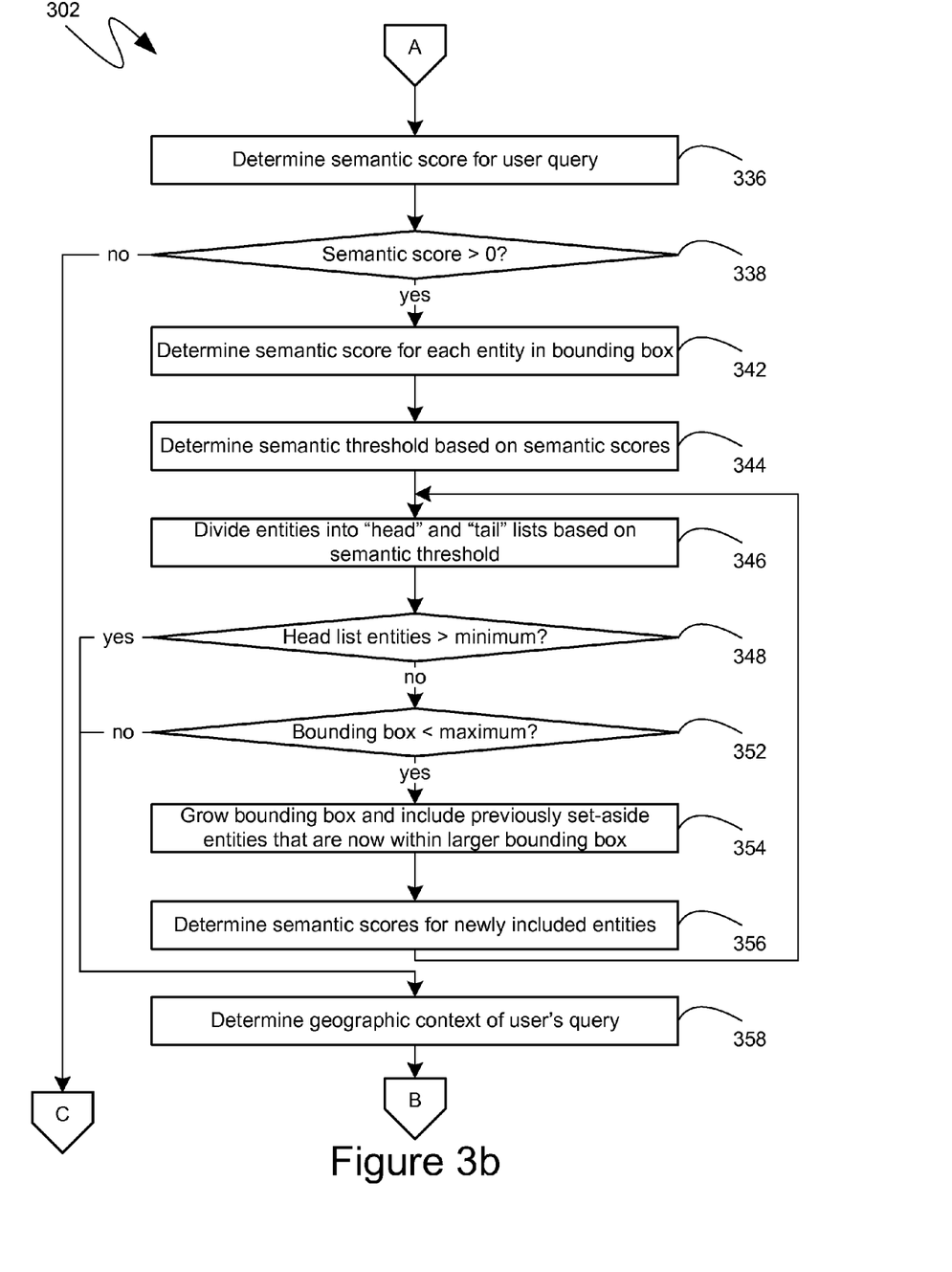

If, however, the determination at step 328 indicates that the user's query is not an entity search then processing can proceed to step 336 shown in FIG. 3b. Turning to FIG. 3b, the flow diagram 302 shown therein is a continuation of the flow diagram 301 shown in FIG. 3a. As can be seen, at step 336, a semantic score can be determined for the user's query to determine whether the user's query is semantically charged. As indicated previously, a query is "semantically charged" if it has meaning and is not merely a name, or other like identification of an entity. In one embodiment, the determination of a semantic score can be based on a collection of reference information, such as could be found in an encyclopedia, a dictionary, or other like reference material. In such an embodiment, all of the information associated with a particular category, such as a food and beverage category, can be processed. A semantic score can then be determined by comparing the terminology of the information for which the semantic score is being determined with the terminology of the selected portion of the reference material. For example, a semantic score for a user query for "coffeehouse" can be determined based on which articles or components in the reference material include the term "coffeehouse" and the number of times that that term appears in each of those articles or components. Each article, or component in the reference material, can define a dimension, and the number of times that a term appears in each article can define a quantity along that dimension such that a semantic score for a particular term can be expressed in the form of a multidimensional vector. Multiple terms can then be compared by comparing these semantic vectors and the distance, in this semantic space, between their endpoints.

In one embodiment the determination of the semantic score for the user's query, such as is determined at step 336, can be based on a comparison of that user query with itself in this semantic space. A semantic score of zero, therefore, can mean that the user's query does not have "meaning" in the sense that the terms of the user's query are not found in any portion of the reference material that was utilized to establish the semantic space. As illustrated previously, a search for the term "coffeehouse" would be semantically charged as such a term would have a semantic score because that term would likely have been utilized at least a few times in a few articles in a portion of reference material that deals with food and beverages. By contrast, a search for the term "John Smith's Coffee Emporium" is not likely to have a semantic score because that term would likely not have been utilized in any article, or other component, of a reference material. Consequently, the term "John Smith's Coffee Emporium" would not be considered to be semantically charged.

After a semantic score for the user's query is determined at step 336, such as in the manner described in detail above, a determination can be made, at step 338, as to whether that semantic score is greater than zero or, stated differently, whether the user's query is semantically charged. If, at step 338, it is determined that the user's query is not semantically charged and that the semantic score determined at step 336 is zero, then processing can proceed with step 374, shown in the flow diagram 304 of FIG. 3d, which will be described in detail below. By contrast, if, at step 338, it is determined that the user's query is semantically charged and that the semantic score determined at step 336 is greater than zero, then processing can proceed with step 342 at which point a semantic score can be determined for each entity which remains after the entities outside of the bounding box were set aside at step 326, as described previously. The determination of the semantic scores of the entities, at step 342, can proceed in the same manner as described in detail above except that, in one embodiment, the semantic score of a particular entity can be based on a comparison of a vector, in semantic space, that represents the user's query with a vector, again in semantic space, that represents the entity. For semantic purposes, an entity can be represented with reference to terms utilized in, for example, a search result associated with that entity, such as a webpage or other collection of data. Stated differently, the semantic score that can be determined for each entity, at step 342, can be a representation of the semantic difference, or distance, between that entity and the user's query.

From the semantic scores determined at step 342, a semantic threshold can be determined at step 344. In one embodiment, a semantic threshold can be determined as a predefined percentage of the highest, or lowest, semantic score that was determined at step 342. More specifically, a typical distribution of semantic scores can be assumed and the relationship between a threshold score and an extreme score, such as a highest score, or a lowest score, can be defined. Subsequently, given such an extreme score, which can be obtained from the scores determined at step 342, the threshold score can be derived therefrom. In another embodiment, the determination of the semantic threshold, at step 344, can be based on the actual distribution of the semantic scores determined at step 342.

At step 346, the entities, namely those remaining from the list compiled at step 316, after the ones outside of the bounding box were set aside at step 326, can be divided in accordance with the semantic threshold that was determined at step 344 such that those entities having a semantic score, as determined at step 342, that is higher than the semantic threshold can be part of a "head list", while those entities having a semantic score, again as determined at step 342, that is lower than the semantic threshold can be part of a "tail list". As indicated previously, such a division of the entity list into two parts is described only for the sake of simplicity and clarity of description, and the mechanisms described are not limited to only a two-part division. Instead, at step 344, multiple semantic thresholds could have been determined such that, at step 346, the entities would have been divided among three or more parts.

Subsequently, at step 348, before any ranking is applied to either the head list or the tail list, a determination can first be made whether there are a sufficient number of entities in the head list. Thus, at step 348, if the head list comprises more entries than a minimum, processing can proceed to step 358. Conversely, if, at step 348, there are fewer entries in the head list than a minimum number of entries, processing can first proceed to step 352, at which point a determination can be made as to whether the bounding box has already reached a maximum size. If, at step 352, it is determined that the bounding box is not less than the maximum size, and thus cannot be enlarged further, then processing can proceed with step 358. However, if, at step 352, the geographic size of the bounding box is less than the maximum geographic size, then processing can proceed with step 354 at which point the geographic size of the bounding box can be increased and entities that were previously set aside as not being within the prior bounding box, such as at step 326, can, now, at step 354, be included in the larger bounding box. At step 356 semantic scores for the newly included entities can be determined in a manner analogous to that utilized at step 344. Processing can then return to step 346 and the entities can again be divided into a head list and a tail list. As can be seen, the execution of the steps 346 through 356 can be repeated until either the head list has a sufficient number of entries or until the geographic size of the bounding box reaches a maximum geographic size. Once either of those two conditions are reached, processing can proceed with step 358, as indicated previously.

At step 358, the geographic context of the user's query can be determined. As indicated previously, the geographic context of the user's query can indicate the geographic region within which the user sought to search such as, for example, a geographic region proximate to the user, or, alternatively, a geographic region at some other location, such as, for example, a location to which the user is traveling or within which the user desires to have the search performed. Processing can then proceed with step 362 shown in the flow diagram 303 of FIG. 3c.

Figure 3C:
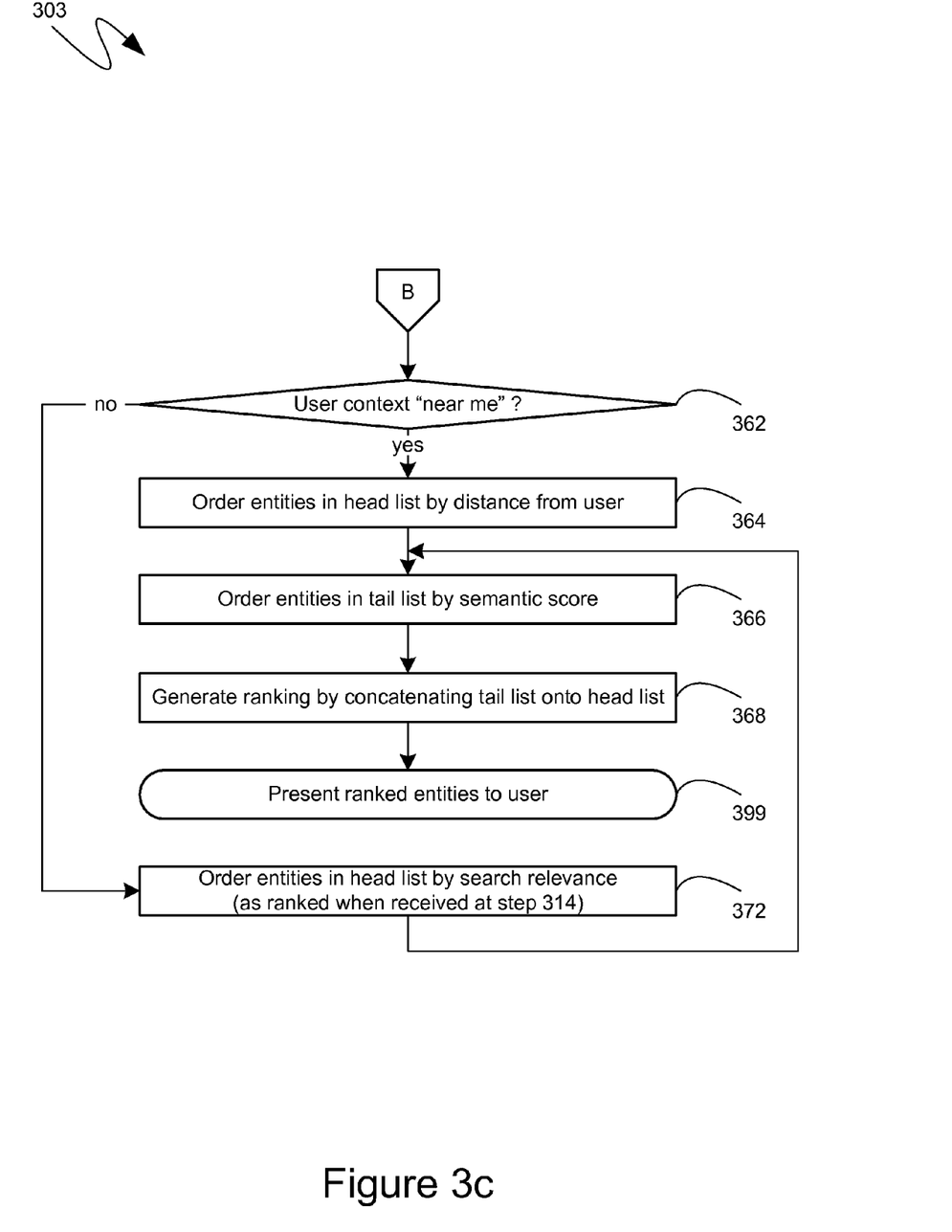

Turning to FIG. 3c, the flow diagram 303 shown therein illustrates a further series of exemplary steps that can be performed in connection with the steps illustrated previously in flow diagrams 301 and 302. As illustrated, at step 362, once a geographic context of the user's query has been determined, a determination can be made as to whether that context is "near me", or otherwise indicating that the user wishes to search for entities that are proximate to the user's location, or, alternatively, whether the user desires to search for entities in a different geographic region. If the former, then processing can proceed with step 364 at which point the entities that are part of the head list can be sorted according to their distance from the user. For example, at step 364, the entities in the head list can be sorted such that the entity closest to the user is listed first, and the entity, among the entities in the head list, that is furthest from the user can be listed last. Subsequently, at step 366, the entities in the tail list can be sorted by their semantic scores, such as were determined at step 342 and, optionally, at step 356. For example, at step 366, the entities in the tail list can be sorted such that the entity having a highest semantic score can be listed first, and the entity, among the entities in the tail list, having a lowest semantic score can be listed last.

At step 368, the entities of the head list, ranked as they were at step 364, and the entities in the tail list, ranked as they were at step 366, can be concatenated together with the entities in the tail list being concatenated onto the end of the entities in the head list. In the case of multiple parts, the concatenation, at step 368, can maintain the relative order of each individual part, such as in the manner shown. Subsequently, processing can proceed to step 399 where the relevant processing can end with the presentation of the ranked entities, generated by the concatenating at step 368, to the user.

If, at step 362, the geographic context of the user's query was not found to be proximate to the user's location, processing can skip to step 372 where the entities in the head list can be sorted, not by their distance from the user, as in step 364, but rather by the search relevance, such as in the order in which the search results associated with those entities were received at step 314. Processing can then proceed with steps 366, 368 and 399, as described above. Thus, as can be seen, by splitting the search results, and the entities derived therefrom, into multiple parts, the ranking applied to some of the individual parts can vary, such as based on the geographic context of the user's query, without affecting the ranking applied to other ones of the individual parts.

Figure 3D:
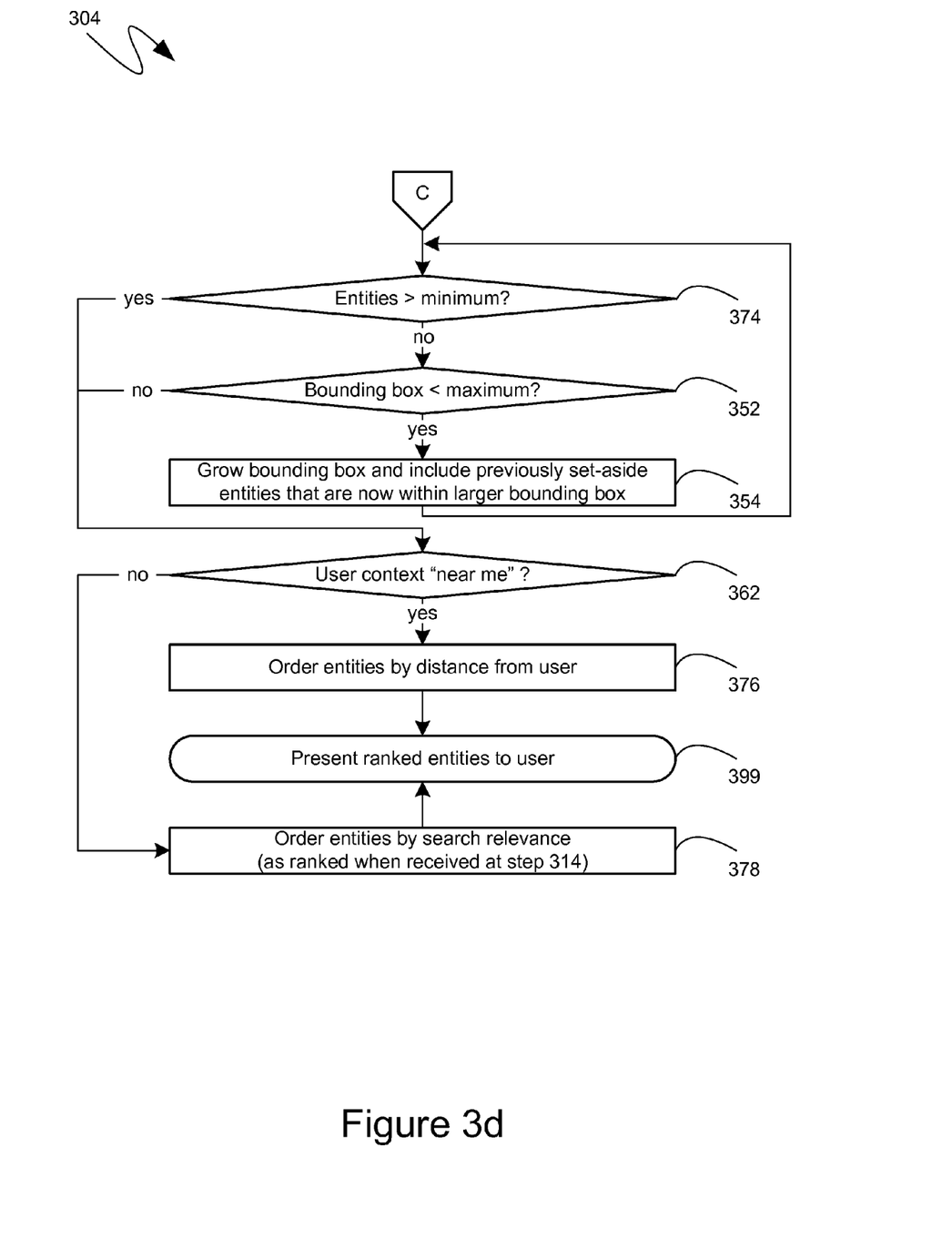

Returning back to the flow diagram 302 shown in FIG. 3b, if, at step 338, it was determined that the user's query was not semantically charged and had a semantic score of zero, then processing can proceed with step 374 shown in the flow diagram 304 of FIG. 3d. Turning to the flow diagram 304 of FIG. 3d, a determination can be made, at step 374, as to whether the number of entities left in the bounding box, after the entities outside of the bounding box were set aside at step 326, is greater than the minimum number of entities. If, at step 374, it is determined that the number of entities left is greater than the minimum number of entities, then processing can proceed to step 362, which, though graphically reproduced in the flow diagram 304 of FIG. 3d, is the same as the step 362 described in detail above and shown in FIG. 3c and, as such, carries the same reference numeral. Conversely, if, at step 374, it is determined that the number of entities is less than the minimum, processing can proceed with step 352 which, again, is graphically reproduced in the flow diagram 304 of FIG. 3d, though it is the same as the step 352 described in detail above and shown in FIG. 3b and, as such, carries the same reference numeral. Analogously to that described in detail above, if, at step 374, it is determined that there are not a minimum number of entities in the entity list and, at step 352, it is determined that the geographic size of the bounding box has not yet reached its maximum, then processing can proceed with step 354, where the geographic size of the bounding box is increased and previously set aside entities are now within this geographically larger bounding box. As before, step 354 is graphically reproduced in the flow diagram 304 of FIG. 3d, though it is the same as the step 354 described in detail above and shown in FIG. 3b, which is why it carries the same reference number. Conversely, if, at step 374 it is determined that there are at least a minimum number of entities in the entity list or, alternatively, if there are not a minimum number of entities in the entity list, as determined at step 374, but the geographic size of the bounding box has reached its maximum geographic size, as determined at step 352, then processing can proceed to step 362 which, as described previously, can determine whether the user sought to search for entities that are proximate to the user.

If, at step 362, it is determined that the user did intend to search for entities proximate to that user's location, then processing can proceed to step 376, and the entities can be ranked by their distance from the user. As before, the ranking of the entities at step 376 can be such that those entities closest to the user are assigned higher rankings, while those entities that are furthest from the user are assigned lower rankings. The relevant processing can then end at step 399, with the ranked entities being presented to the user. Conversely, if, at step 362, it is determined that the user did not intend to search for entities proximate to that user's location, then processing can proceed to step 378 and the entities can be ranked by search relevance, which, as indicated previously, can be the order in which the search results, from which the entity information was derived, were received at step 314. The relevant processing can then end at step 399, with the ranked entities being presented to the user.

As can be seen from the above descriptions, mechanisms for implementing a multi-part ranking have been enumerated. In view of the many possible variations of the subject matter described herein, we claim as our invention all such embodiments as may come within the scope of the following claims and equivalents thereto.

We claim:

1. One or more computer-readable storage media comprising computer-executable instructions for generating a ranked list of entities associated with search results, the computer-executable instructions directed to steps comprising:
receiving search results to a location relevant query;
deriving entities from the received search results;
determining whether the location relevant query is semantically charged;
ranking the derived entities as a single set only if the location relevant query is either not semantically charged or is an entity search;
dividing, only if the location relevant query is semantically charged, the entities into at least a first part and a second part according to at least one relevance threshold such that those entities associated with a higher relevance than the at least one relevance threshold comprise the first part and those entities associated with a lower relevance than the at least one relevance threshold comprise the second part;

ranking the entities in the first part utilizing a first ranking methodology;

ranking the entities in the second part utilizing a second ranking methodology that is independent from the first ranking methodology; and concatenating the ranked entities in the second part onto an end of the ranked entities in the first part.

2. The computer-readable storage media of claim 1, comprising further computer-executable instructions for determining, only if the location relevant query is semantically charged, a semantic score for individual ones of the entities; wherein the at least one relevance threshold is a threshold semantic score.

3. The computer-readable storage media of claim 1, wherein the determining whether the location relevant query is semantically charged is based on a utilization, in the location relevant query, of equivalent terms as those found in individual ones of a collection of reference materials.

4. The computer-readable storage media of claim 1, comprising further computer-executable instructions for excluding the derived entities that are geographically located outside of a geographic region defined by a bounding box.

5. The computer-readable storage media of claim 4, comprising further computer-executable instructions for determining the geographic region defined by the bounding box based on the location relevant query and a location of a user making the location relevant query.

6. The computer-readable storage media of claim 4, comprising further computer-executable instructions for growing the bounding box by increasing the geographic region defined by the bounding box until either a maximum bounding box size is reached or until a minimum quantity of entities remain after the excluding.

7. The computer-readable storage media of claim 6, wherein the minimum quantity of entities is based only on a quantity of entities divided into the first part.

8. The computer-readable storage media of claim 1, wherein the first ranking methodology is based on physical distance between entity locations and a user-specified location and wherein further the second ranking methodology is based on semantic distance between the location relevant query and search results associated with entities.

9. A method for utilizing a computing device to generate a ranked list of entities associated with search results, the method comprising the steps of:

receiving, at the computing device, search results to a location relevant query;

deriving, with one or more processing units of the computing device, entities from the received search results;

determining, with the one or more processing units, whether the location relevant query is semantically charged;

ranking, with the one or more processing units, the derived entities as a single set only if the location relevant query is either not semantically charged or is an entity search;

dividing, with one or more processing units, only if the location relevant query is semantically charged, the entities into at least a first part and a second part according to at least one relevance threshold such that those entities associated with a higher relevance than the at least one relevance threshold comprise the first part and those entities associated with a lower relevance than the at least one relevance threshold comprise the second part;

ranking, with the one or more processing units, the entities in the first part utilizing a first ranking methodology;

ranking, with the one or more processing units, the entities in the second part utilizing a second ranking methodology that is independent from the first ranking methodology; and concatenating, with the one or more processing units, the ranked entities in the second part onto an end of the ranked entities in the first part.

10. The method of claim 9, further comprising the steps of determining, with the one or more processing units, only if the location relevant query is semantically charged, a semantic score for individual ones of the search results; wherein the at least one relevance threshold is a threshold semantic score.

11. The method of claim 9, wherein the determining whether the location relevant query is semantically charged is based on a utilization, in the location relevant query, of equivalent terms as those found in individual ones of a collection of reference materials.

12. The method of claim 9, further comprising the steps of excluding the derived entities that are geographically located outside of a geographic region defined by a bounding box.

13. The method of claim 12, further comprising the steps of determining, with the one or more processing units, the geographic region defined by the bounding box based on the location relevant query and a location of a user making the location relevant query.

14. The method of claim 12, further comprising the steps of growing the bounding box by increasing the geographic region defined by the bounding box until either a maximum bounding box size is reached or until a minimum quantity of entities remain after the excluding.

15. The method of claim 14, wherein the minimum quantity of entities is based only on a quantity of entities divided into the first part.

16. The method of claim 9, wherein the first ranking methodology is based on physical distance between entity locations and a user-specified location and wherein further the second ranking methodology is based on semantic distance between the location relevant query and search results associated with entities.

17. A system for providing a ranked list of entities, the system comprising:

a mobile computing device comprising: a search application transmitting a query from a user of the mobile computing device; and a position component providing a geographic position of the mobile computing device; and one or more search server computing devices together comprising: a search engine generating search results responsive to the query; a classifier determining whether the query is a location relevant query; and a ranker performing steps comprising: receiving search results to a location relevant query; deriving entities from the received search results; determining whether the location relevant query is semantically charged; ranking the derived entities as a single set only if the location relevant query is either not semantically charged or is an entity search; dividing, only if the location relevant query is semantically charged, the entities into at least a first part and a second part according to at least one relevance threshold such that those entities associated with a higher relevance than the at least one relevance threshold comprise the first part and those entities associated with a lower relevance than the at least one relevance threshold comprise the second part; ranking the entities in the first part utilizing a first ranking methodology; ranking the entities in the second part utilizing a second ranking methodology that is independent from the first ranking methodology; and concatenating the ranked entities in the second part onto an end of the ranked entities in the first part.

18. The system of claim 17, wherein the ranker performs further steps comprising determining, only if the location relevant query is semantically charged, a semantic score for individual ones of the search results; wherein the at least one relevance threshold is a threshold semantic score.

19. The system of claim 17, wherein the ranker performs further steps comprising excluding the derived entities that are geographically located outside of a geographic region defined by a bounding box; and wherein further the mobile computing device specifies the bounding box.

20. The system of claim 19, wherein the ranker performs further steps comprising growing the bounding box by increasing the geographic region defined by the bounding box until either a maximum bounding box size is reached or until a minimum quantity of entities remain after the excluding.

* * * * *